United States Patent
Miyazawa

(10) Patent No.: US 9,568,742 B2
(45) Date of Patent: Feb. 14, 2017

(54) IMAGE STABILIZATION APPARATUS, CONTROL METHOD THEREOF, OPTICAL APPARATUS AND IMAGE CAPTURING APPARATUS

(71) Applicant: CANON KABUSHIKI KAISHA, Tokyo (JP)

(72) Inventor: Hitoshi Miyazawa, Kuki (JP)

(73) Assignee: Canon Kabushiki Kaisha, Tokyo (JP)

( * ) Notice: Subject to any disclaimer, the term of this patent is extended or adjusted under 35 U.S.C. 154(b) by 729 days.

(21) Appl. No.: 13/686,121

(22) Filed: Nov. 27, 2012

(65) Prior Publication Data

US 2013/0163084 A1 Jun. 27, 2013

(30) Foreign Application Priority Data

Dec. 22, 2011 (JP) .................. 2011-282266

(51) Int. Cl.
G02B 27/64 (2006.01)
G03B 5/00 (2006.01)
H04N 5/232 (2006.01)

(52) U.S. Cl.
CPC ............ *G02B 27/64* (2013.01); *G02B 27/646* (2013.01); *G03B 5/00* (2013.01); *G03B 2205/0015* (2013.01); *G03B 2217/005* (2013.01); *H04N 5/23258* (2013.01); *H04N 5/23287* (2013.01)

(58) Field of Classification Search
CPC ......... G02B 27/64; G02B 27/646; G03B 5/00; G03B 15/00; G03B 2205/0015; H04N 5/23248; H04N 5/23251; H04N 5/23258; H04N 5/23264
See application file for complete search history.

(56) References Cited

U.S. PATENT DOCUMENTS

| 8,023,809 B2 * | 9/2011 | Washisu | G03B 17/00 348/208.4 |
| 8,811,809 B2 * | 8/2014 | Miyazawa | H04N 5/23258 348/208.99 |
| 2008/0069552 A1 * | 3/2008 | Washisu | G03B 5/00 396/55 |

FOREIGN PATENT DOCUMENTS

| JP | 07-225405 | 8/1995 |
| JP | 2010-025961 | 2/2010 |
| JP | 2010-025962 | 2/2010 |
| JP | 2010054883 A | 3/2010 |
| JP | 2010054986 A | 3/2010 |

* cited by examiner

*Primary Examiner* — Thong Nguyen
(74) *Attorney, Agent, or Firm* — Cowan, Liebowitz & Latman, P.C.

(57) ABSTRACT

An image stabilization apparatus includes an image stabilization unit that compensates image blurring by moving a compensation member, a first shake detection unit that detects an angular velocity of the shake, a second shake detection unit that detects shake by a different method, an orientation detection unit that detects an inclination status of an optical apparatus, a calculation unit that calculates a compensation value from signals of the first and second shake detection units, and an output unit that compensates the output of the first shake detection unit using the compensation value, with the calculation unit performing weighting on the compensation value of a drive axis of an image stabilization mechanism, based on a correlation between the first signal and the second signal.

10 Claims, 10 Drawing Sheets

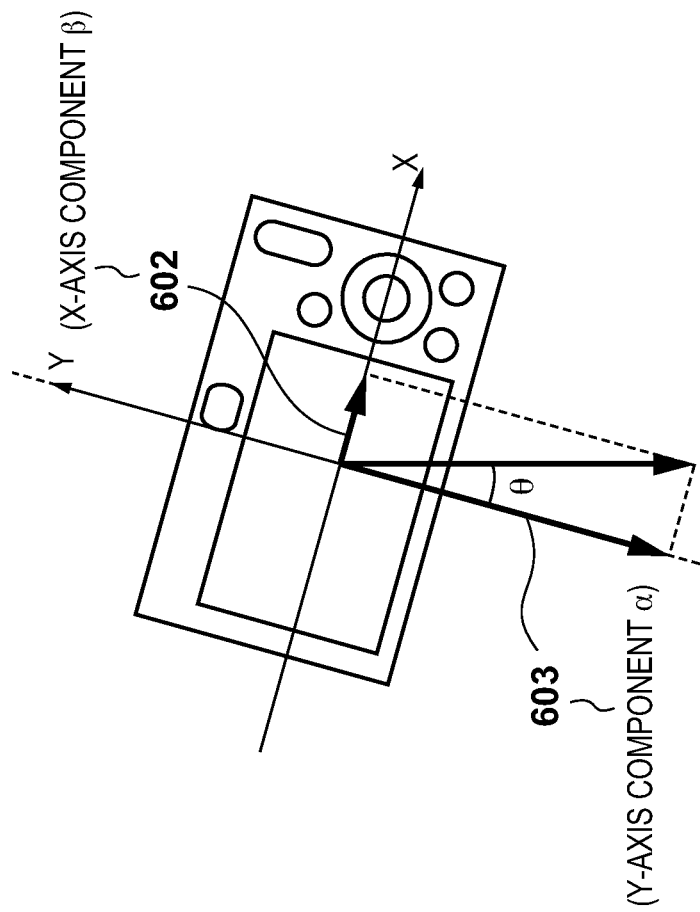
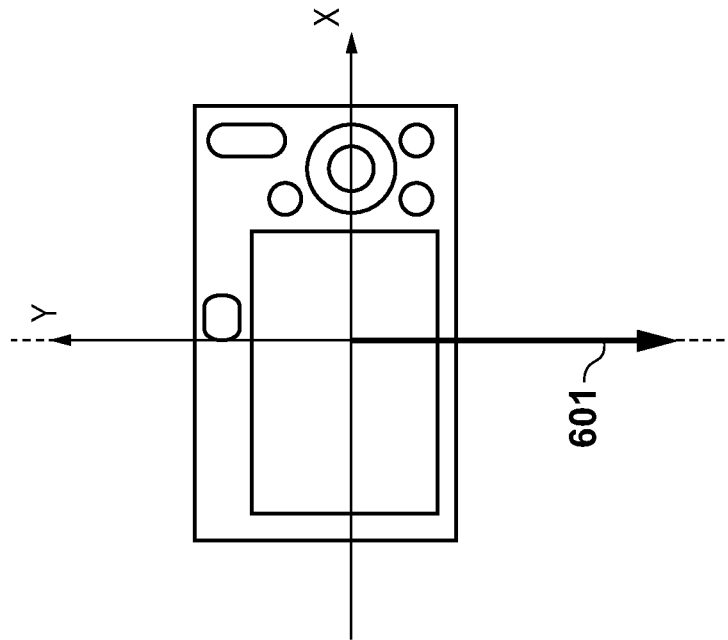

F I G. 7
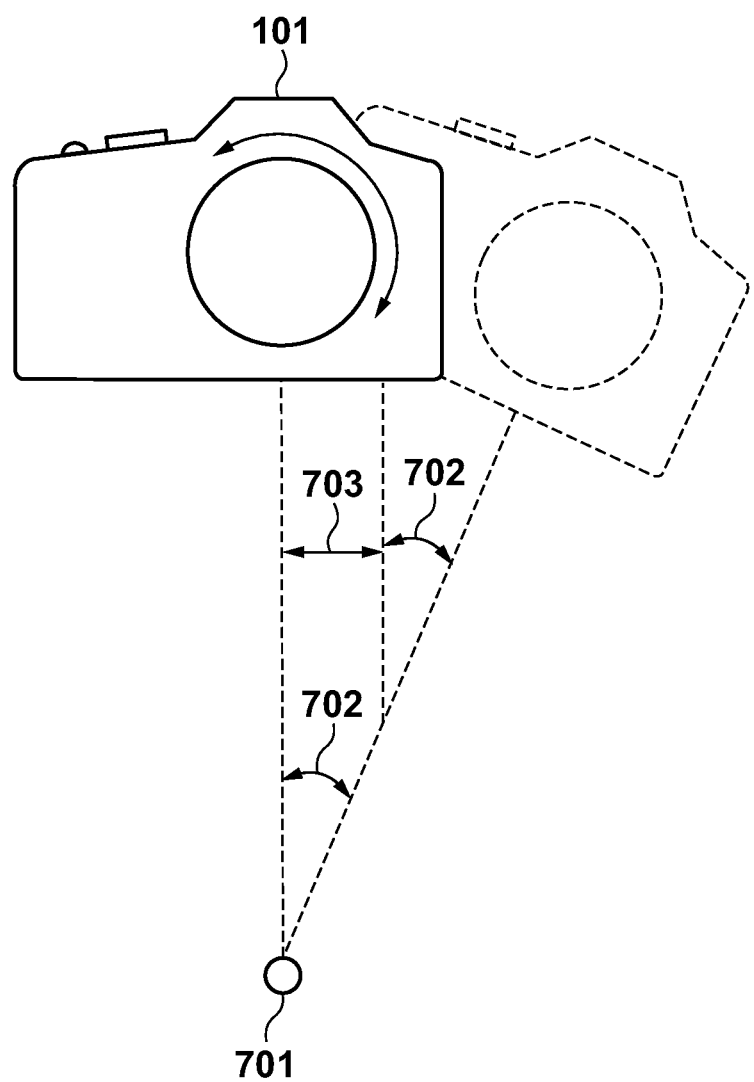

IMAGE STABILIZATION APPARATUS, CONTROL METHOD THEREOF, OPTICAL APPARATUS AND IMAGE CAPTURING APPARATUS

BACKGROUND OF THE INVENTION

Field of the Invention

The present invention relates to image stabilization technology for compensating image blurring (for preventing image degradation) due to shake of an apparatus such as camera shake.

Description of the Related Art

Cameras provided with an image stabilization apparatus (consisting of an image stabilization unit, a driver, a shake detection unit, etc.) that prevents image blurring due to camera shake or the like are currently available, and factors inducing the photographer to make a photographic error have mostly been eliminated.

Here, an image stabilization apparatus that prevents image blurring will be briefly described. Camera shake due to the photographer is usually vibration having a frequency of 1 Hz to 10 Hz.

In order to enable photographs without image blurring to be taken even when camera shake occurs, vibration of the camera due to camera shake has to be detected and a lens for image blurring compensation (hereinafter, compensation lens) has to be displaced according to the detected value.

However, with photography at close range (photography at high magnification), image degradation due to so-called parallel shake that occurs in a direction parallel to or perpendicular to the optical axis of the camera and is undetectable with only a gyroscope also cannot be disregarded. Parallel shake needs to be actively detected and compensated under conditions where, for example, images are captured within 20 cm or so of the subject such as with macro photography, or the focal length of the photographic optical system is extremely long (e.g., 400 mm) despite the subject being positioned at a distance of one meter or so.

With technology disclosed in Japanese Patent Laid-Open No. 7-225405, there is a problem in that the output of the accelerometer tends to be affected by disturbance noise and changes in the environment such as temperature change, and these destabilizing factors are further magnified by performing second order integration, making it difficult to compensate parallel shake with high accuracy.

In Japanese Patent Laid-Open No. 2010-25962, destabilizing factors of the accelerometer such as the above can be mitigated by only deriving the rotation center for frequency bands that tend not to be affected by disturbance. In Japanese Patent Laid-Open No. 2010-25961, technology is disclosed for calculating compensation values up until the time when the image capture operation on the image stabilization target is started, and performing parallel shake compensation during image capture using the compensation values.

However, with a method of performing parallel shake compensation using the rotation radius of angular shake, the rotation radius needs to be correctly derived, and the following issue arises.

That is, although the detection accuracy of the various sensors is important in the case of using an accelerometer and a gyroscope to compute the rotation radius, computation of the rotation radius is not correctly derived in the case where sensor noise exerts a significant influence, and a suitable parallel shake compensation effect is not obtained. Particularly in the case where the proportion of noise amount in the accelerometer output is large, there is concern that the rotation radius will be misestimated, resulting in a large amount of parallel shake compensation, and deterioration in image stabilization performance due to overcompensation.

Because the amount of noise is generally constant regardless of the magnitude of acceleration, in the case where there is significant parallel shake, that is, in the case of a high acceleration output value, the noise exerts little influence on the rotation radius estimation, and the amount of parallel shake compensation can be correctly derived.

However, in the case where there is very little parallel shake, that is, in the case where an acceleration output value is small, the noise exerts a significant influence on the rotation radius estimation, making it difficult to correctly derive the parallel shake compensation amount. In other words, differences in the amount of camera shake due to the shooting posture or the like will give rise to differences in the detection accuracy of parallel shake, that is, differences in the image stabilization effect.

Also, when using a gyroscope and an accelerometer to compute the rotation radius, the following problems arise when attempting to derive the rotation radius and perform parallel shake compensation in the case where the correlation between the angular velocity signal and the acceleration signal is low. That is, because parallel shake is misdetected since the correlation between the output of the gyroscope and the output of the accelerometer is low, image stabilization performance may be adversely affected.

Furthermore, the correlation relationship may differ greatly depending on the orientation of the camera. For example, since roll angular velocity cannot be detected in the case where a pitch and yaw dual-axis gyroscope is provided, when the roll rotation exerts a significant influence, not only is it impossible to perform suitable parallel shake compensation but controllability deteriorates due to overcompensation.

Also, the drive axis that tends to be affected by roll compensation changes depending on the inclination status (shooting orientation) of the camera (e.g., parallel shake due to the influence of the roll angular velocity tends to occur on the yaw axis in the case of a normal status and on the pitch axis in the case of a vertical status).

SUMMARY OF THE INVENTION

The present invention has been made in view of the above problems, and provides an image stabilization apparatus that is compact, has high mobility, and is also able to correct parallel shake with high accuracy.

According to a first aspect of the present invention, there is provided an image stabilization apparatus mounted on an optical apparatus, comprising: an image stabilization unit configured to compensate image blurring due to shake, by moving a compensation member in directions to drive axes that are orthogonal to an optical axis; a first shake detection unit configured to detect an angular velocity of the shake; a second shake detection unit configured to detect shake by a different method from the first shake detection unit; an orientation detection unit configured to detect an inclination status of the optical apparatus; a calculation unit configured to calculate, for each of the drive axis directions, a compensation value from a first signal based on output of the first shake detection unit, a second signal based on output of the second shake detection unit, and an orientation determination value based on the orientation detection unit, the compensation value being a moving amount of the compensation member; and an output unit configured to compensate the output of the first shake detection unit using the compensation values, wherein the calculation unit performs weighting on the compensation value of each of the drive axes of an image stabilization mechanism, based on a correlation between the first signal which is based on the output of the first shake detection unit and the second signal which is based on the output of the second shake detection unit using each orientation determination value.

According to a second aspect of the present invention, there is provided an image stabilization apparatus for mounting in an optical apparatus, comprising: an image stabilization unit configured to compensate image blurring due to shake, by moving a compensation member; a first shake detection unit configured to detect an angular velocity of the shake; a second shake detection unit configured to detect shake by a different method from the first shake detection unit; an orientation detection unit configured to detect an inclination status of the optical apparatus; a calculation unit configured to calculates a compensation value that is a moving amount of the compensation member, from a first signal which is based on output of the first shake detection unit, a second signal which is based on output of the second shake detection unit, and an orientation determination value which is based on the orientation detection unit; a correlation determination unit configured to determine a correlation between the first signal which is based on the output of the first shake detection unit and the second signal which is based on the output of the second shake detection unit; and an output unit configured to compensate the output of the first shake detection unit using the compensation value, wherein the calculation unit performs weighting on the compensation value of a drive axis of an image stabilization mechanism, based on a determination result of the correlation determination unit.

According to a third aspect of the present invention, there is provided a control method of an image stabilization apparatus for mounting in an optical apparatus, comprising: an image stabilization step of compensating image blurring due to shake, by moving a compensation member; a first shake detection step of detecting an angular velocity of the shake; a second shake detection step of detecting shake by a different method from the first shake detection step; an orientation detection step of detecting an inclination status of the optical apparatus; a calculation step of calculating a compensation value that is a moving amount of the compensation member, from a first signal which is based on output of the first shake detection step, a second signal which is based on output of the second shake detection step, and an orientation determination value which is based on the orientation detection step; and an output step of compensating the output of the first shake detection step using the compensation value, wherein, in the calculation step, weighting is performed on the compensation value of a drive axis of an image stabilization mechanism, based on a correlation between the first signal which is based on the output of the first shake detection step and the second signal which is based on the output of the second shake detection step using each orientation determination value.

According to a fourth aspect of the present invention, there is provided a control method of an image stabilization apparatus for mounting in an optical apparatus, comprising: an image stabilization step of compensating image blurring due to shake, by moving a compensation member; a first shake detection step of detecting an angular velocity of the shake; a second shake detection step of detecting shake by a different method from the first shake detection step; an orientation detection step of detecting an inclination status of the optical apparatus; a calculation step of calculating a compensation value that is a moving amount of the compensation member, from a first signal which is based on output of the first shake detection step, a second signal which is based on output of the second shake detection step, and an orientation determination value which is based on the orientation detection step; a correlation determination step of determining a correlation between the first signal which is based on the output of the first shake detection step and the second signal which is based on the output of the second shake detection step; and an output step of compensating the output of the first shake detection step using the compensation value, wherein, in the calculation step, weighting is performed on the compensation value of a drive axis of an image stabilization mechanism, based on a determination result in the correlation determination step.

Further features of the present invention will become apparent from the following description of exemplary embodiments with reference to the attached drawings.

BRIEF DESCRIPTION OF THE DRAWINGS

FIGS. 6A and 6B are diagrams for illustrating the inclination orientation of a camera.

FIG. 7 is a diagram of the rotation center of roll shake.

DESCRIPTION OF THE EMBODIMENTS

Hereafter, embodiments of the present invention will be described in detail with reference to the accompanying drawings.

First Embodiment

Figure 1:
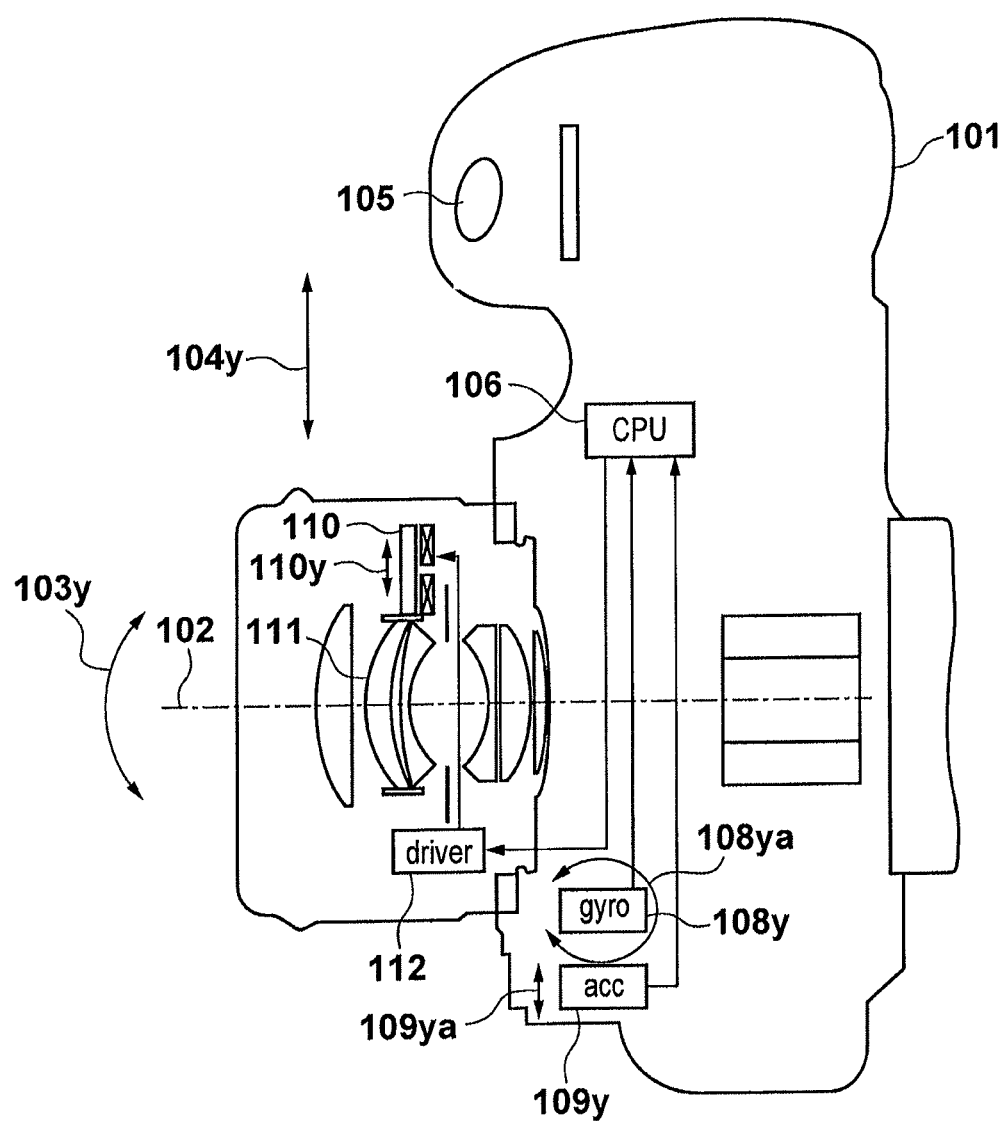
FIG. 1 is a top view of a camera having mounted therein an image stabilization system in an embodiment of the present invention.
Figure 2:
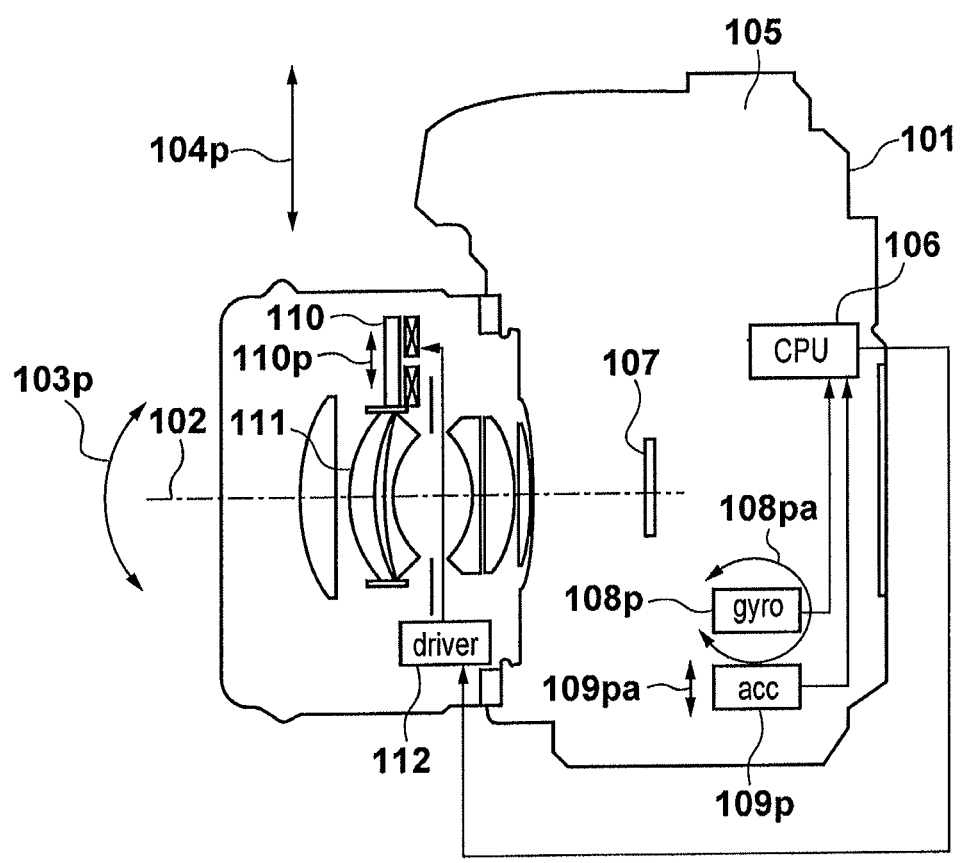
FIG. 2 is a side view of a camera having mounted therein an image stabilization system in an embodiment of the present invention.

FIG. 1 and FIG. 2 are a top view and a side view showing a digital camera serving as an image capturing apparatus provided with an image stabilization apparatus (compensation mechanism) according to a first embodiment of the present invention. An image stabilization system mounted in this camera performs image stabilization on shake indicated by arrows $103p$ and $103y$ (hereinafter, angular shake) relative to an optic axis $102$ and shake indicated by arrows $104p$ and $104y$ (hereinafter, parallel shake). Note that "p" in the reference sign represents the pitch direction and "y" represents the yaw direction.

A camera 101 includes a release button 105, a camera CPU 106 and an image sensor 107. First shake detection units (angular velocity detectors; hereinafter, gyroscopes) 108$p$ and 108$y$ respectively detect angular shake around arrows 108$pa$ and 108$ya$. Also, second shake detection units (acceleration or velocity detectors accelerometers such as, the shift lens, or movement vectors; hereinafter, accelerometers) 109$p$ and 109$y$ respectively detect parallel shake indicated by arrows 109$pa$ and 109$ya$.

A lens driver 110 drives an image stabilization lens (compensation member) 111 freely in the directions of arrows 110$p$ and 110$y$ in FIG. 1 and FIG. 2, and performs image stabilization that takes both angular shake and parallel shake into consideration. Note that the directions 110$p$ and 110$y$ are each orthogonal to the optical axis, and 110$p$ and 110$y$ are also orthogonal to each other. Here, the outputs of the gyroscopes 108$p$ and 108$y$ and the accelerometers 109$p$ and 109$y$ are input to the camera CPU 106. Image stabilization is performed by a driver 112 depending on the association of these outputs.

Note that the method of compensation based on compensation amounts may be a method that involves performing image stabilization by moving the image sensor 107 within a plane perpendicular to the optical axis. Also, a method that involves using electronic image stabilization for reducing the influence of shake by changing the trimming position of each captured frame output by the image sensor may be adopted. Furthermore, compensation may be performed by combining these methods.

Figure 3:
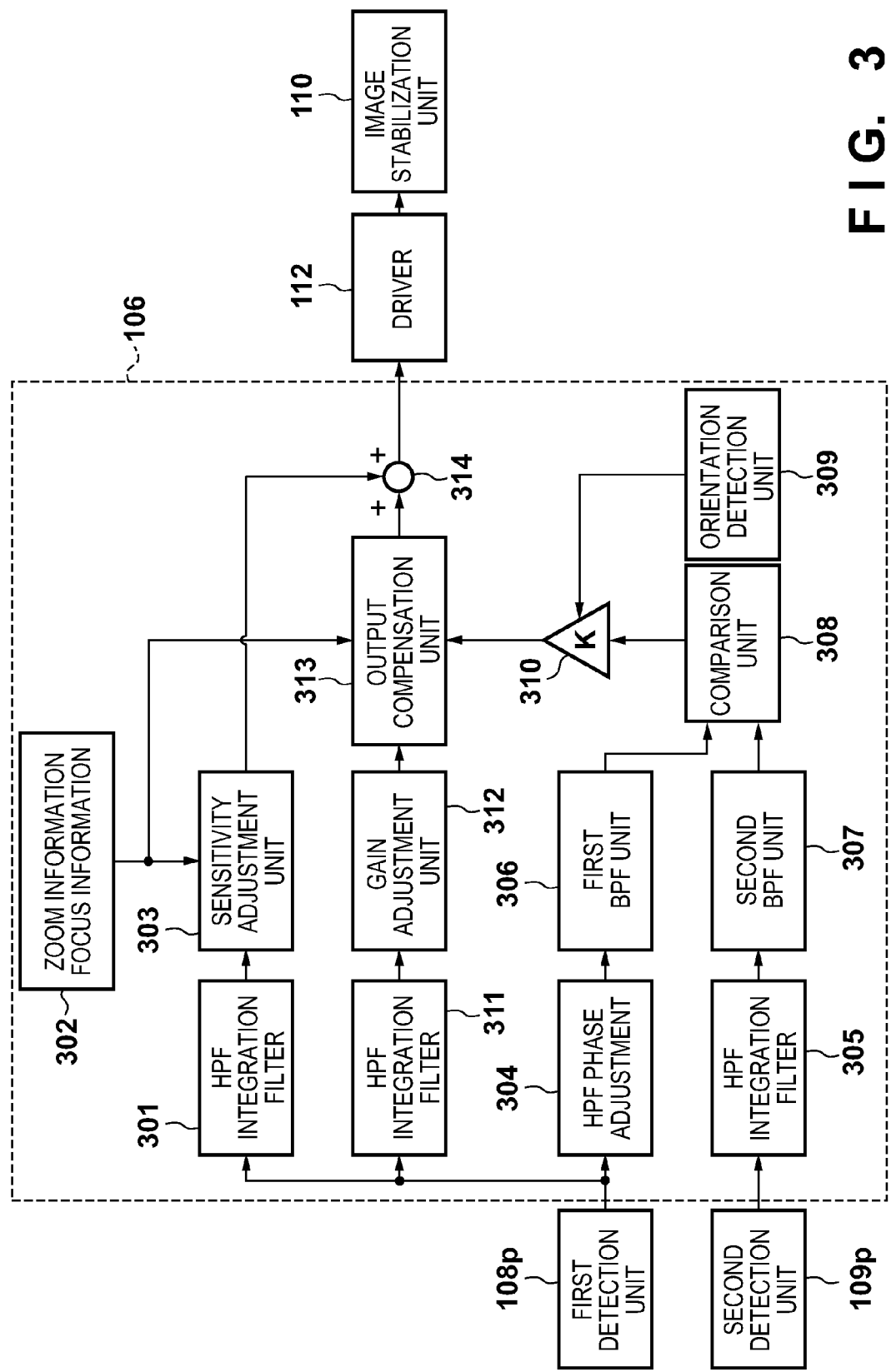
FIG. 3 is a block diagram of an image stabilization apparatus according to a first embodiment.
Figure 4:
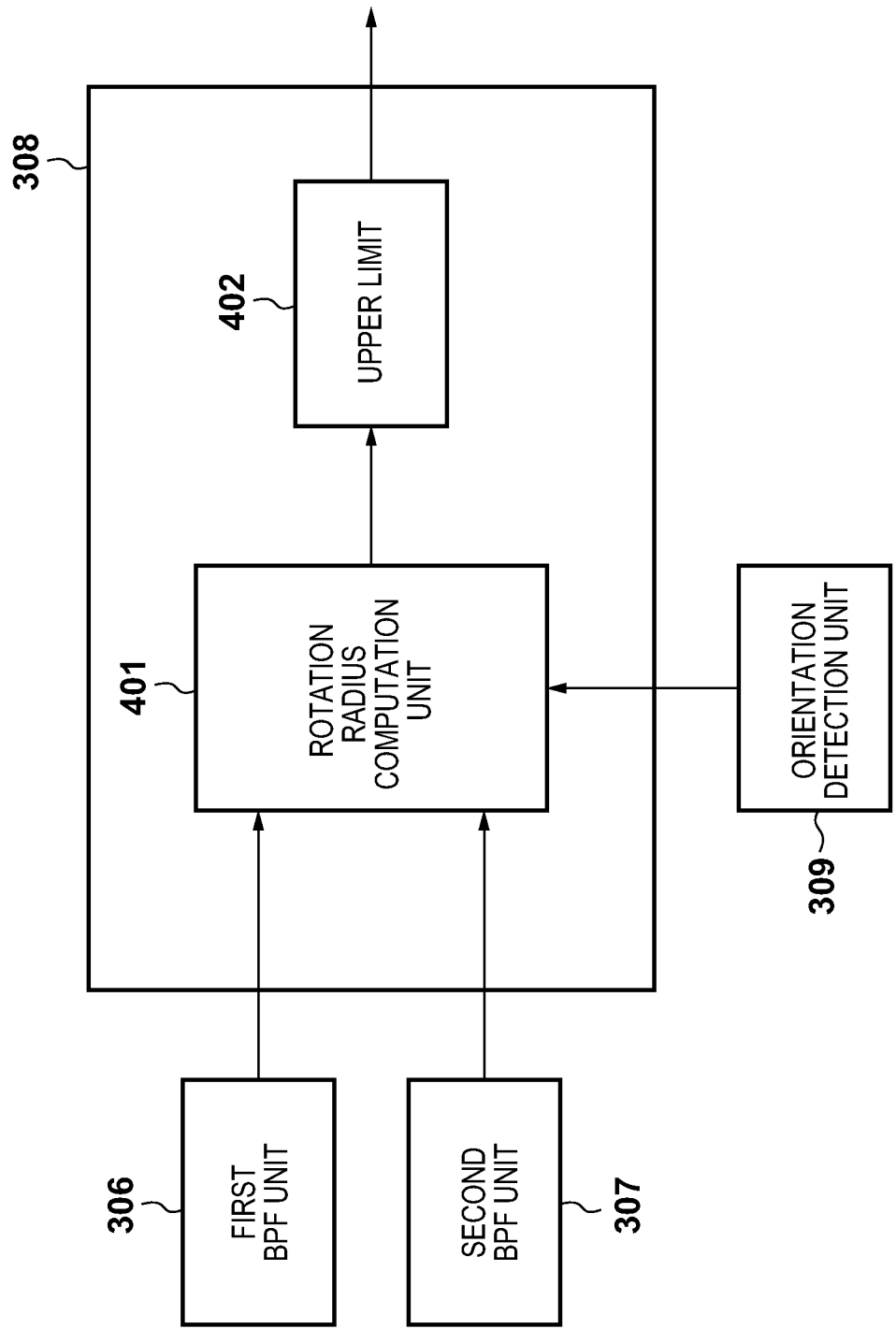
FIG. 4 is a block diagram illustrating a comparison unit of the image stabilization apparatus according to the first embodiment.

FIG. 3 is a block diagram showing an image stabilization apparatus according to the first embodiment of the present invention. In FIG. 3, only a configuration for shake that occurs in the vertical direction of the camera (pitch direction: directions of arrow 103$p$ and 104$p$ in FIG. 2) is shown. However, a similar configuration is also provided for shake that occurs in the horizontal direction of the camera (yaw direction: direction of arrows 103$y$ and 104$y$ in FIG. 1). Because these configurations are basically the same, only the configuration for the pitch direction is illustrated hereinafter, and description thereof will be given. Note that FIG. 4 is a diagram showing an internal configuration of a comparison unit 308 in FIG. 3.

Compensation of angular shake will be described first, using FIG. 3. An angular velocity signal (first signal) from the gyroscope 108$p$ is input to the CPU 106. This angular velocity signal is input to an HPF integration filter 301, where the signal is integrated and converted to an angle signal after the DC component (direct current component) has been cut by a HPF (high-pass filter). Here, the frequency band of camera shake is 1 Hz to 10 Hz. Thus, the HPF has first order HPF characteristics for cutting frequency components at or below 0.1 Hz, for example, that are sufficiently separated from the frequency band of camera shake.

The output of the HPF integration filter 301 is input to a sensitivity adjustment unit 303. The sensitivity adjustment unit 303 amplifies the output of the HPF integration filter 301 based on zoom and focus position information 302 and the shooting magnification derived from this information, and the amplified output is taken as an angular shake compensation target value. This is in order to compensate for changes in the image stabilization sensitivity in the camera image plane relative to the image stabilization stroke (movable range of compensation) of an image stabilization unit 110 depending on changes in optical information on the focus and zoom of the lens and the like.

The CPU 106 outputs the derived angular shake compensation target value to the driver 112, and image blurring compensation is executed by driving the image stabilization unit 110. The above is a schematic configuration for angular shake compensation.

Next, parallel shake compensation will be described. The output of the gyroscope 108$p$ is imported to the CPU 106. This output is then input to a HPF integration filter 311, where the output is integrated and converted to an angle signal after the DC component has been cut by a HPF. The output of the HPF integration filter 311 is input to a gain adjustment filter (hereinafter, gain adjustment unit) 312. Gain and phase characteristics over the frequency band in which parallel shake compensation is to be performed are adjusted by the gain adjustment unit 312 and the HPF integration filter 311.

The output of the gain adjustment unit 312 is compensated by an output compensation unit 313 which will be discussed later, and the compensated output is taken as a parallel shake compensation target value and added to the abovementioned angular shake compensation target value by an adder 314.

Also, at same time as the above processing, the output of the gyroscope 108$p$ is input to an HPF phase adjustment filter (hereinafter, phase adjustment unit) 304, where the DC component superimposed on the output of the gyroscope 108$p$ is cut and phase adjustment of the signal is performed. The cutoff frequency here is set in accordance with the cutoff frequency of a HPF of an HPF integration filter 305 which will be discussed later, and is adjusted so that the frequency characteristics match. Only the frequency components of a prescribed band are extracted from the output of the HPF phase adjustment unit 304 by a first BPF unit (band-pass filter) 306 which is a band-pass unit.

The output signal (second signal) of the accelerometer 109$p$ is input to the HPF integration filter 305, where the signal is integrated and converted to a velocity signal after the DC component has been cut by a HPF. The cutoff frequency of the HPF at this time is set in accordance with the frequency characteristics of the HPF of the HPF phase adjustment unit 304, as mentioned above. Only the frequency components of a prescribed band are extracted from the output of the HPF integration filter 305 by an accelerometer BPF unit (band-pass filter) 307 which is a band-pass unit.

Note that although the accelerometer 109$p$ is used in FIG. 3, any method other than a technique using the gyroscope 108$p$ may be adopted. For example, external force (shake) applied to the image stabilization unit 110 may be detected, and the velocity of the external force may be derived. Also, a method using motion vectors may be adopted.

The outputs of the first BPF unit 306 and the second BPF unit 307 are input to the comparison unit (calculation unit) 308. Also, an orientation determination value which is the inclination status of the image capturing apparatus is output by an orientation detection unit 309, the output of the orientation detection unit 309 is input to the comparison unit 308 together with the outputs of the first BPF unit 306 and the second BPF unit 307, and the compensation amount (compensation coefficient) for compensating the output of the gain adjustment unit 312 is computed. The method of determining the inclination status of the image capturing apparatus in the orientation detection unit 309 may be a method that involves using an accelerometer to detect the inclination of the image capturing apparatus from the output values thereof. The method of calculating the compensation amount in the comparison unit 308 will be discussed later.

The zoom and focus information 302 is also input to the output compensation unit 313, the shooting magnification is calculated from the zoom and focus information 302, the output of the gain adjustment unit 312 is compensated based on the derived shooting magnification and the aforementioned compensation amount, and the resultant value is taken as the parallel shake compensation target value. The derived parallel shake compensation target value is added to the aforementioned angular shake compensation target value and the resultant value is output to the driver 112. The image stabilization unit 110 will thereby be driven by the driver 112, and image blurring respectively caused by angular shake and parallel shake will be compensated.

Figure 5:
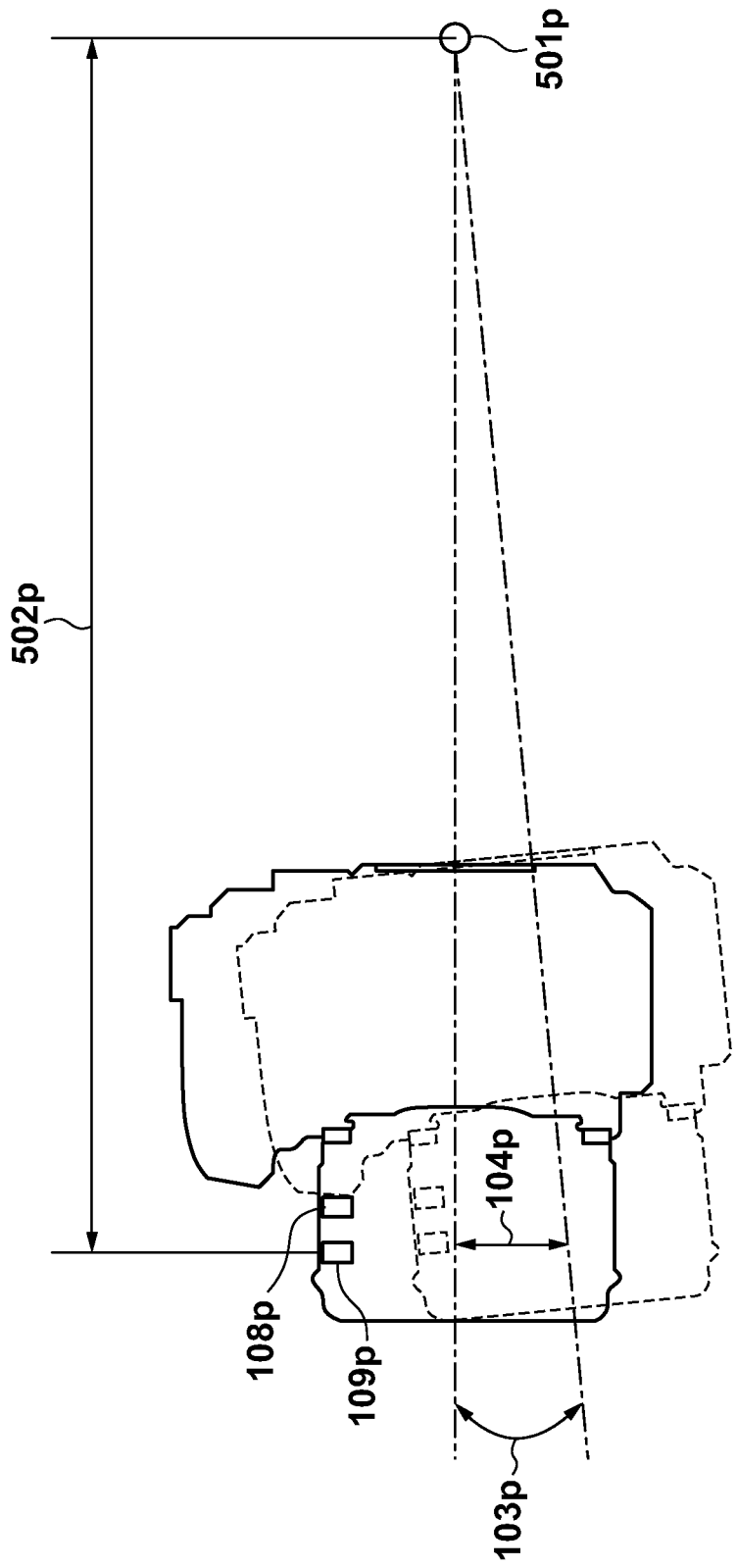
FIG. 5 is an illustrative diagram of the rotation center of pitch shake.

Next, the compensation value output from the comparison unit 308 will be described. FIG. 5 is a diagram showing angular shake 103p and parallel shake 104p applied to the camera. The relationship of the rotation radius L (502p) with parallel shake Y (104p) and angular shake θ (103p) at the principal point position of the imaging optical system in the shooting lens of the camera 101 in the case where a rotation center O (501p) is given can be represented with the following equations (1), (2) and (3).

$$Y = L\theta \quad (1)$$

$$V = L\omega \quad (2)$$

$$A = L\omega a \quad (3)$$

Note that the rotation radius L (502p) is the distance from the rotation center 501p to the accelerometer 109p.

Here, equation (1) is the rotation radius L in the case where displacement Y is derived by performing second order integration on the output of the accelerometer 109p, and angle θ is derived by performing first order integration on the output of the gyroscope 108p. Equation (2) is the rotation radius L in the case where velocity V is derived by performing first order integration on the output of the accelerometer 109p, and angular velocity ω is derived from the output of the gyroscope 108p. Equation (3) is the rotation radius L in the case where acceleration A is derived from the output of the accelerometer 109p, and angular acceleration ωa is derived by performing first order differentiation on the output of the gyroscope 108p. The rotation radius L can be derived with any of these methods.

Shake δ that occurs in the imaging plane is derived by the following equation (4) from the parallel shake Y and the shake angle θ at the principal point position of the imaging optical system and the focus length f and the shooting magnification β of the imaging optical system.

$$\delta = (1+\beta)f\theta + \beta Y \quad (4)$$

Here, f and β in the first term on the right side are derived from the zoom and focus of the imaging optical system and the shooting magnification β and the focus length f obtained therefrom, and the shake angle θ is derived from the integration result of the gyroscope 108p. Therefore, the moving amount of the image stabilization lens 111 can be computed and angular shake compensation can be performed, as described using FIG. 3, according to this information.

Also, because the second term on the right side is derived from the second order integration value Y of the accelerometer 109p, the zoom and focus, and the shooting magnification β obtained therefrom, parallel shake compensation can be performed as described using FIG. 3 according to this information.

However, in the present embodiment, image blurring compensation is performed on shake δ obtained by rewriting equation (4) as the following equation (5).

$$\delta = (1+\beta)f\theta + \beta L\theta \quad (5)$$

That is, with regard to parallel shake, the parallel shake displacement Y derived directly from the accelerometer 109p is not used. The rotation radius L derived by equation (1), equation (2) or equation (3) is initially derived, and compensation is performed using this rotation radius L, the integration result θ of the output of the gyroscope 108p, the zoom and focus, and the shooting magnification β obtained therefrom.

As described above, in a method of performing parallel shake compensation using the rotation radius of angular shake, the rotation radius needs to be correctly derived. However, in the case of computing the rotation radius using an accelerometer and a gyroscope, there is concern that, in the case where sensor noise exerts a significant influence, the rotation radius will be misestimated, resulting in a large amount of parallel shake compensation and deterioration of image stabilization performance due to overcompensation.

Because the amount of noise is generally constant regardless of the magnitude of acceleration, the noise exerts a significant influence in the case where there is very little parallel shake, making it difficult to correctly derive the rotation radius. Differences in the amount of camera shake depending on the shooting posture and the like will thus give rise to differences in the detection accuracy of parallel shake, that is, differences in the image stabilization effect.

The reason for providing an upper limit processing unit 402 as shown in FIG. 4 in the comparison unit 308 will be described here. Although a rotation radius calculation unit 401 in the comparison unit 308 derives the rotation radius according to the output of the first BPF unit 306 and the output of the second BPF unit 307, the rotation radius could possibly be greatly misestimated depending on calculation timing, in the case where there are a plurality of the rotation centers and the accelerometer 109y detects the combined shake from these rotation centers. This is because the rotation radius calculation unit 401 is for computing the rotation radius in a frequency band set with the output of the first BPF unit 306 and the second BPF unit 307. That is, in the case where frequency bands other than the frequency band set with the output of the first BPF unit 306 and the second BPF unit 307 exert a significant influence, the rotation radius calculation unit 401 may not be able to correctly derive the rotation radius in the set frequency band.

Also, the parallel shake of the frequency band set with the output of the first BPF unit 306 and the second BPF unit 307 can be adequately suppressed when the rotation radius is set to a large value here. However, there is concern that gain will at the same time also be increased for camera shake of higher frequency bands, resulting in deterioration in image stabilization performance in high frequency bands of camera shake due to overcontrol.

In the case of still image photography, photographers mostly shoot while holding the camera firmly so as to avoid camera shake, and often the rotation radius at that time is not that great. Thus, in order to prevent deterioration in image stabilization control performance due to overcontrol, an upper limit of the frequency band set with the output of the first BPF unit 306 and the second BPF unit 307 is set here.

Here, the orientation determination value output from the orientation detection unit 309 in FIG. 3 will be described. As for methods of detecting the inclination of the image capturing apparatus, the direction in which the image capturing apparatus is facing may be determined using an accelerometer, for example, by comparing the direction in which the image capturing apparatus is facing and the direction of gravitational acceleration detected with the accelerometer. Also, an orientation sensor may be used, or the gravitational force acting on the image stabilization lens 111 may be detected from the current value of the lens driver 110.

A method of detecting the orientation of the image capturing apparatus using accelerometer output is shown in FIGS. 6A and 6B. FIG. 6A is a diagram showing accelerometer output in a horizontal orientation, and in this case, gravitational acceleration is output as a Y-axis component 601, as is well known. FIG. 6B shows an orientation inclined at an angle θ from the horizontal orientation, and discrimination of the orientation of the image capturing apparatus from a normal status orientation to a vertical status orientation is possible using the value of the angle θ, with computation of the angle θ being performed using equation (6).

$$\theta = \arctan(\beta/\alpha) \times 180/\pi \quad (6)$$

Also, with close-up photography, inclination of the image capturing apparatus not only relative to the horizontal direction but also in a tilt direction, such as a shot taken with the image capturing apparatus facing straight down, for example, is also conceivable. A method of detecting inclination in the tilt direction involves deriving the angle θ using the output of the accelerators, with regard to the Y-axis component and the Z-axis component in the case of the normal status orientation, and with regard to the Z-axis component and the X-axis component in the case of the vertical status orientation. Note that, alternatively, the gravitational force acting on the focus lens which is not shown may be detected from the current value of the focus lens driver (not shown).

Here, the inclination angle in the horizontal direction is given as θ1, the inclination angle in the normal status tilt direction is given as θ2, and the inclination angle in the vertical status tilt direction is given as θ3. As mentioned above, the current inclination orientation of the image capturing apparatus is known by using the acceleration information of the three axial components.

FIG. 7 is a diagram showing parallel shake in the horizontal direction that occurs due to roll rotation. Parallel shake 703 due to roll rotation occurs when the camera 101 rotates at a roll angle 702r due to roll rotation. For example, in the case where a pitch and yaw dual-axis (arrows 103p and 103y) gyroscope (108p, 108y) is used, roll shake cannot be detected. Thus, in the case where roll shake exerts a significant influence, parallel shake will be misdetected because of parallel shake 703 due to roll rotation being added, resulting in deterioration in controllability in addition to not being able to perform parallel shake compensation correctly. Also, the axis that is influenced by this roll shake changes depending on differences in the orientation of the camera.

Also, the correlation relationship between the output signal of the gyroscope and the output signal of the accelerometer on each axis may differ greatly depending on the inclination status (shooting orientation) of the camera 101. This is conceivably caused by various factors such as there being a plurality of rotation centers and the influence of the aforementioned roll shake.

In the case where the camera 101 is in the normal status orientation, the correlation between the output signal of the gyroscope and the output signal of the accelerometer with regard to the pitch axis is high in this orientation, whereas the correlation between the output signal of the gyroscope and the output signal of the accelerometer is low with regard to the yaw axis direction. The output signal of the gyroscope and the output signal of the accelerometer could possibly be greatly out of phase when the correlation is low, in which case the rotation radius will be misestimated when computed, which could result in a drop in the accuracy of image stabilization.

Also, in the case where the camera 101 is in the vertical status orientation, the correlation between the output signal of the gyroscope and the output signal of the accelerometer is high with regard to the yaw axis, whereas the correlation between the output signal of the gyroscope and the output signal of the accelerometer is low with regard to the pitch axis direction. Thus, because the rotation radius of the pitch axis cannot be computed correctly, the accuracy of image stabilization of the pitch axis could drop similarly to the case of the normal status orientation.

In view of this, in the first embodiment, the amount of parallel shake compensation is lowered so as to not overcompensate by determining the orientation of the camera using the orientation determination values output from the orientation detection unit 309, and multiplying the drive axis for which correlation is low according to differences in orientation by a weighted gain 310.

The method of multiplying the weighted gain 310 referred to here will be described. If it determined as a result of the orientation determination that the camera is in a horizontal normal status orientation, parallel shake compensation on the pitch side is actively performed and the control amount of parallel shake compensation on the yaw side is lowered because correlation is low. That is, the amount of parallel shake compensation is lowered so as to not overcompensate, by setting the yaw-side compensation gain to a lower value than the pitch-side compensation gain. For example, the pitch-side compensation gain is set to around 1 fold, and the yaw-side compensation gain is set to around 0.5 fold.

On the other hand, if it is determined that the camera is in a horizontal vertical status orientation, parallel shake compensation on the yaw side is actively performed, and the control amount of parallel shake compensation on the pitch side is lowered because correlation is low. That is, the amount of parallel shake compensation is lowered so as to not overcompensate, by setting the pitch-side compensation gain to a lower value than the yaw-side compensation gain. For example, the pitch-side compensation gain is set to around 0.5 fold, and the yaw-side compensation gain is set to around 1 fold.

Although the output of the comparison unit 308 is multiplied by a weighted gain in the present embodiment, the output of the first BPF unit 306 or the output of the second BPF unit 307 may be multiplied by a weighted gain. Also, each of these outputs may be multiplied by a weighted gain.

As thus described in the first embodiment, a drop in the accuracy of image stabilization due to rotation radius misdetection can be prevented by multiplying the drive axis for which correlation is low by a small weighted gain, according to the inclination status of the camera using the orientation determination values.

Second Embodiment

The present embodiment differs from the first embodiment in the following respects. In the present embodiment, the correlation between the output signal of the gyroscope and the output signal of the accelerometer is determined every sampling instant, and in the case where correlation is high, the compensation gain is set to around 1 fold and parallel shake compensation is actively performed. Also, in the case where correlation is low, the compensation gain is set to around 0.5 fold and parallel shake compensation is lowered.

Figure 8:
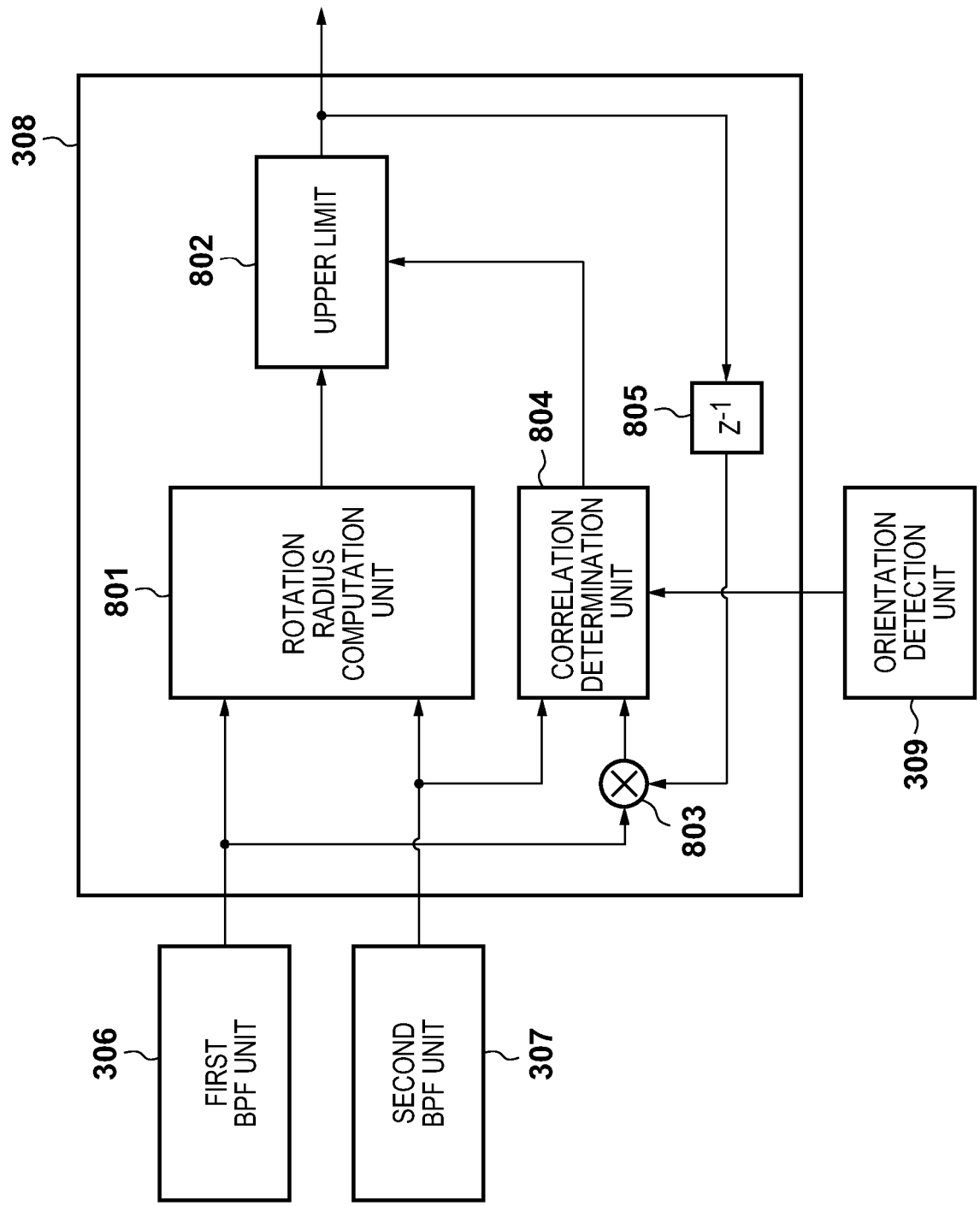
FIG. 8 is a block diagram illustrating a comparison unit of an image stabilization apparatus according to a second embodiment.

A comparison unit of an image stabilization control system in the second embodiment is shown using FIG. 8. The output of the first BPF unit 306 and the output of the second BPF unit 307 are input to a rotation radius computation unit 801, where the rotation radius is computed with equation (7).

$$L = V/\omega \qquad (7)$$

The output of the rotation radius computation unit 801 is input to an upper limit processing unit 802, which outputs a signal clamped to an upper limit.

Figure 9:
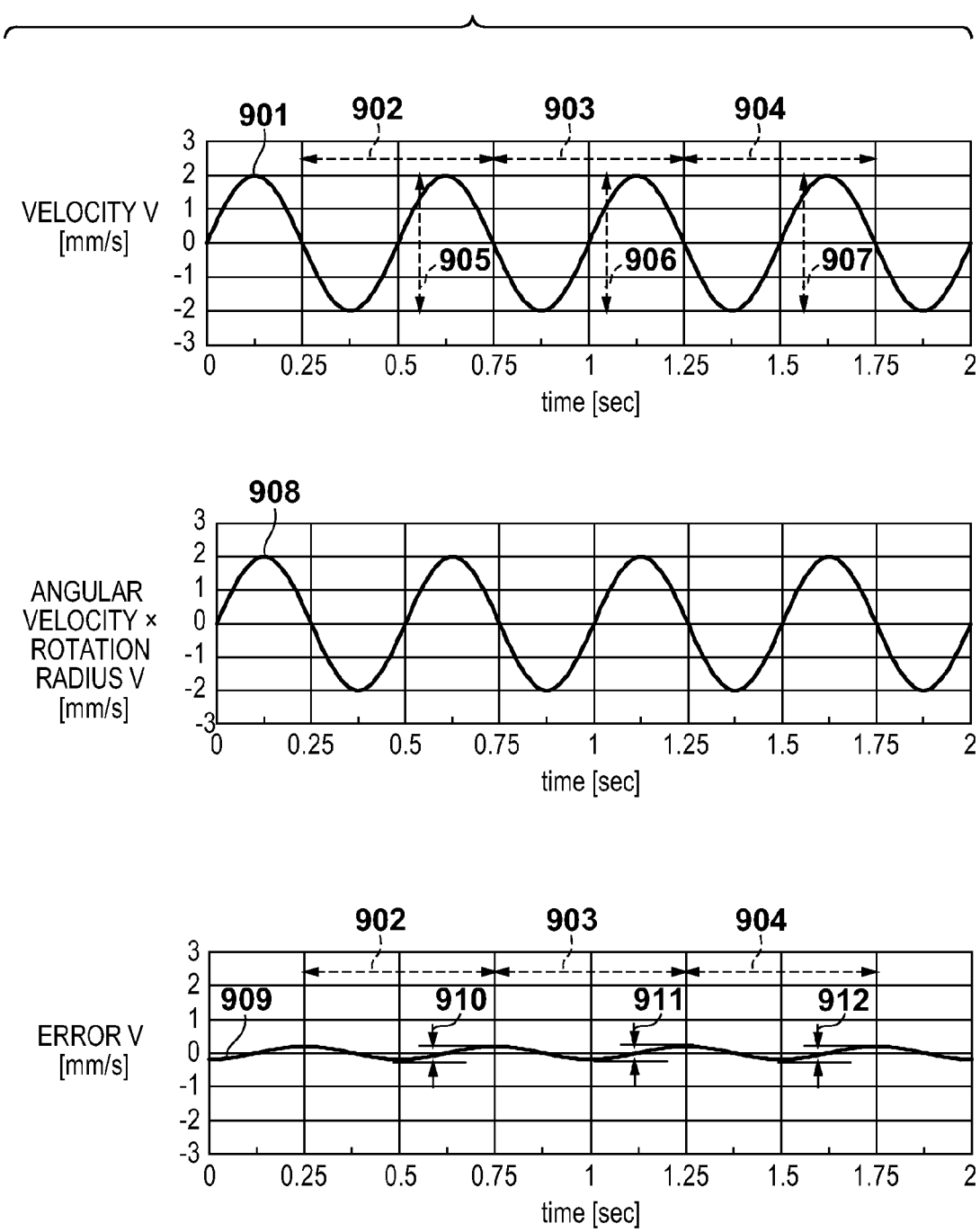
FIG. 9 is a diagram for illustrating waveforms of the image stabilization apparatus according to the second embodiment.

Here, a method of determining the correlation between the output signal of the gyroscope and the output signal of the accelerometer will be described. FIG. 9 is a diagram showing correlation determinations (determination results) of a correlation determination unit 804 in FIG. 8 according to the second embodiment.

A waveform 901 and a waveform 908 in FIG. 9 are signal waveforms obtained by respectively multiplying the output of the second BPF unit 307 and the output of the first BPF unit 306 by the rotation radius L derived by the rotation radius computation unit 801 in the multiplier 803. That is, the waveform 908 is the velocity derived from the gyroscope 108y, and the order will coincide with the waveform 901. Here, because the rotation radius L can be derived using equation (7), the waveform 908 will take the inverse value thereof and the amplitude will be equal to the waveform 901. The waveform 901 and the waveform 908 could, however, also possibly be out of phase.

The correlation determination unit 804 receives the orientation determination value of the orientation detection unit 309, and may perform correlation determination on the drive axis for which correlation could possibly be low for every difference in orientation (e.g., determination may be performed for only the yaw axis if it is determined that the camera is in the normal status orientation) or may perform correlation determination for both axes.

In order to determine the degree of coincidence of the waveform 901 and the waveform 908, the correlation determination unit 804 derives a waveform 909 that is the difference between the waveform 901 and the waveform 908 as an error. The waveform 901 and the waveform 909 are sampled every fixed period, and the results are compared. Arrows 902, 903 and 904 are respectively sampling periods, and the maximum amplitudes (difference between maximum and minimum values) of the waveforms 901 and 909 during these periods are indicated by the arrows 905, 906 and 907 and 910, 911 and 912.

The extraction frequency period is set as the sampling period, and will, for example, be 0.5 second in the case where the frequency is 2 Hz. The maximum amplitudes of the waveforms 901 and 909 for every period thus derived are respectively averaged. The averaging here is in order to avoid the determination accuracy decreasing due to a sudden change in maximum amplitude.

The correlation determination unit 804 starts deriving the maximum amplitudes of the waveforms 901 and 909 in synchronization with the start of detection of the rotation radius L, and performs the respective averaging until immediately before image capture. Furthermore, a coincidence determination value for determining the degree to which the waveforms 901 and 908 coincide is computed by deriving the ratio of these average values. It is determined that the waveform 901 and the waveform 908 more closely coincide as this coincidence determination value decreases.

Note that a method may be adopted in which a moving average for every prescribed period is updated, rather than the average of maximum amplitudes of the waveforms 901 and 909 being the average from rotation radius detection to image capture start. In this case, the coincidence determination value is derived using the value updated immediately before image capture.

Because parallel shake is misdetected in the case where it is determined using the aforementioned determination method that the correlation between the waveforms 901 and 908 is low, parallel shake compensation is lowered by multiplication of a weighted gain that depends on the coincidence determination value of correlation.

Figure 10:
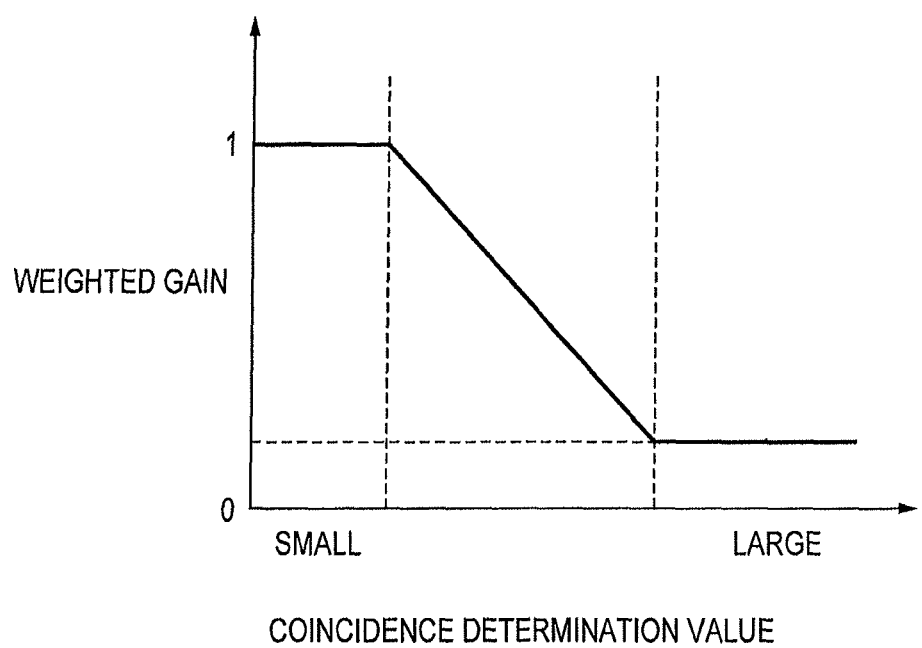
FIG. 10 is a diagram for illustrating weighted gain according to the second embodiment.

Next, weighted gain determination will be described. FIG. 10 is a diagram showing weighted gain characteristics relative to coincidence determination values of correlation. Because correlation is high if the coincidence determination value is small, parallel shake compensation is actively performed by multiplication of a weighted gain of around 1 fold. Because correlation is low in the case where the coincidence determination value is large, the parallel shake control amount is lowered by multiplication of a small gain of around 0.3 fold, for example.

As thus described in the second embodiment, the coincidence determination value of correlation is computed according to differences in camera orientation, a weighted gain is set, and the amount of parallel shake image stabilization is controlled. By determining correlation for every difference in orientation, and controlling image stabilization so as to lower the amount of parallel shake control for the drive axis for which correlation is low, distortion of the image with deterioration of image stabilization control due to misdetection of the rotation radius can thereby be prevented.

The present invention is not limited to an image stabilization apparatus of a digital single lens reflex camera or a digital compact camera, and can be mounted in image capturing apparatuses such as a digital camcorder, a surveillance camera, a Web camera or a mobile phone. Mounting in an optical apparatus such as an interchangeable lens of a single lens reflex camera is also possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2011-282266, filed Dec. 22, 2011, which is hereby incorporated by reference herein in its entirety.

What is claimed is:

1. An image stabilization apparatus mounted on an optical apparatus, comprising:
    an image stabilization unit configured to compensate image blurring due to shake, by moving a compensation member in directions along drive axes of the image stabilization unit that are orthogonal to an optical axis;
    a first shake detection unit configured to detect an angular velocity of the shake;
    a second shake detection unit configured to detect shake by a different method from that used by the first shake detection unit;
    an orientation detection unit configured to detect an inclination status of the optical apparatus relative to a reference position;

a calculation unit configured to calculate, for each of the drive axis directions, a compensation value from a first signal based on output of the first shake detection unit, a second signal based on output of the second shake detection unit, the compensation value being a moving amount of the compensation member; and a weighting unit configured to perform weighting on the compensation value of each of the drive axes of the image stabilization unit, based on a correlation between the first signal which is based on the output of the first shake detection unit and the second signal which is based on the output of the second shake detection unit using an orientation determination value based on the orientation detection unit.

2. The image stabilization apparatus according to claim 1, wherein the weighting unit performs weighting such that the compensation value of a drive axis of the image stabilization unit decreases when the correlation for that compensation value is determined to be low.

3. An optical apparatus comprising the image stabilization apparatus according to claim 1.

4. An image capturing apparatus comprising the image stabilization apparatus according to claim 1.

5. An image stabilization apparatus for mounting in an optical apparatus, comprising:
- an image stabilization unit configured to compensate image blurring due to shake, by moving a compensation member;
- a first shake detection unit configured to detect an angular velocity of the shake;
- a second shake detection unit configured to detect shake by a different method from that used by the first shake detection unit;
- an orientation detection unit configured to detect an inclination status of the optical apparatus relative to a reference position;
- a calculation unit configured to calculates a compensation value that is a moving amount of the compensation member, from a first signal which is based on output of the first shake detection unit, a second signal which is based on output of the second shake detection unit, and an orientation determination value which is based on the orientation detection unit;
- a correlation determination unit configured to determine a correlation between the first signal which is based on the output of the first shake detection unit and the second signal which is based on the output of the second shake detection unit; and
- an output unit configured to compensate the output of the first shake detection unit using the compensation value,
- wherein the calculation unit performs weighting on the compensation value of a drive axis of the image stabilization unit, based on a determination result of the correlation determination unit.

6. The image stabilization apparatus according to claim 5, wherein the correlation between the first signal which is based on the output of the first shake detection unit and the second signal which is based on the output of the second shake detection unit for each drive axis of the image stabilization unit is determined by the correlation determination unit depending on the inclination status of the optical apparatus, and weighting is performed such that the compensation value of the drive axis of the image stabilization unit decreases when the correlation for that compensation value is determined to be low.

7. An optical apparatus comprising the image stabilization apparatus according to claim 5.

8. An image capturing apparatus comprising the image stabilization apparatus according to claim 5.

9. A control method of an image stabilization apparatus for mounting in an optical apparatus, comprising:
- an image stabilization step of compensating image blurring due to shake, by moving a compensation member;
- a first shake detection step of detecting an angular velocity of the shake;
- a second shake detection step of detecting shake by a different method from that used in the first shake detection step;
- an orientation detection step of detecting an inclination status of the optical apparatus relative to a reference position;
- a calculation step of calculating, for each of the drive axis directions, a compensation value that is a moving amount of the compensation member, from a first signal which is based on output of the first shake detection step, a second signal which is based on output of the second shake detection step; and
- a weighting step of weighting the compensation value of each of the drive axes of the image stabilization unit, based on a correlation between the first signal which is based on the output of the first shake detection step and the second signal which is based on the output of the second shake detection step using an orientation determination value based on the orientation detection step.

10. A control method of an image stabilization apparatus for mounting in an optical apparatus, comprising:
- an image stabilization step of compensating image blurring due to shake, by moving a compensation member;
- a first shake detection step of detecting an angular velocity of the shake;
- a second shake detection step of detecting shake by a different method from that used in the first shake detection step;
- an orientation detection step of detecting an inclination status of the optical apparatus relative to a reference position;
- a calculation step of calculating a compensation value that is a moving amount of the compensation member, from a first signal which is based on output of the first shake detection step, a second signal which is based on output of the second shake detection step, and an orientation determination value which is based on the orientation detection step;
- a correlation determination step of determining a correlation between the first signal which is based on the output of the first shake detection step and the second signal which is based on the output of the second shake detection step; and
- an output step of compensating the output of the first shake detection step using the compensation value,
- wherein, in the calculation step, weighting is performed on the compensation value of a drive axis of the image stabilization unit, based on a determination result in the correlation determination step.

\* \* \* \* \*